(12) United States Patent
Freund et al.

(10) Patent No.: US 7,245,121 B2
(45) Date of Patent: Jul. 17, 2007

(54) DEVICE AND METHOD FOR DETERMINING THE PATH OF A TARGET

(75) Inventors: Thomas Freund, Mannheim (DE); Heiko Hoebel, Worms (DE)

(73) Assignee: Pepperl + Fuchs GmbH (DE)

( * ) Notice: Subject to any disclaimer, the term of this patent is extended or adjusted under 35 U.S.C. 154(b) by 32 days.

(21) Appl. No.: 10/565,910

(22) PCT Filed: Jul. 28, 2004

(86) PCT No.: PCT/EP2004/008454

§ 371 (c)(1),
(2), (4) Date: Jan. 25, 2006

(87) PCT Pub. No.: WO2005/012840

PCT Pub. Date: Feb. 10, 2005

(65) Prior Publication Data

US 2006/0244440 A1    Nov. 2, 2006

(30) Foreign Application Priority Data

Jul. 31, 2003  (DE) ................. 103 35 133

(51) Int. Cl.
G01B 7/14 (2006.01)
(52) U.S. Cl. ............... 324/207.16; 324/207.24
(58) Field of Classification Search ............... 324/207.12–207.26
See application file for complete search history.

(56) References Cited

U.S. PATENT DOCUMENTS 3,846,771 A    11/1974  Young et al.
4,652,821 A    3/1987   Kreft
4,843,259 A *  6/1989   Weisshaupt ............... 327/510
5,504,425 A *  4/1996   Fericean et al. .......... 324/207.16
5,574,366 A *  11/1996  Joost ....................... 324/207.26
5,742,161 A *  4/1998   Karte ..................... 324/207.16

FOREIGN PATENT DOCUMENTS

| DE | 25 49 627 A1 | 6/1976 |
| DE | 31 00 486 A1 | 2/1982 |
| DE | 101 25 278 A1 | 12/2002 |
| DE | 101 29 819 A1 | 1/2003 |
| DE | 102 32 710 A1 | 4/2003 |

* cited by examiner

Primary Examiner—Jay M. Patidar
(74) Attorney, Agent, or Firm—John A. Merecki; Hoffman, Warnick & D'Alessandro, LLC

(57) ABSTRACT

The invention relates to a device for determining the path of an in particular metallic target, with at least two detection devices so positioned along a path to be monitored that the sensitivity curves of immediately adjacent detection devices at least partly overlap, the detection devices in each case having at least one inductance coil and at least one oscillator and as a function of a damping of the oscillator by the target supply a distance signal, with at least one converting device operatively connected to the detection devices for converting the dampings detected by the detection devices into analog signals, particularly current and/or voltage signals, and with at least one evaluating device operatively connected to the converting device or devices for determining and reading out a local position of the target from the analog signals going back to the detection devices.

24 Claims, 4 Drawing Sheets

Figure 3:
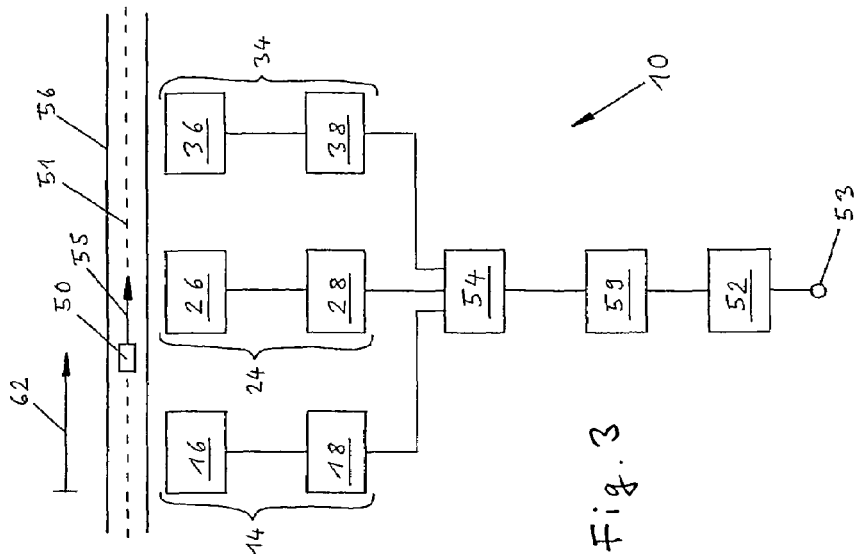

| U1/U2 | 0 | 0,2 | 0,4 | 0,6 | 0,8 | 1 |
|---|---|---|---|---|---|---|
| 0 | a00 | a10 | .. | .. | .. | a50 |
| 0,1 | a01 | a11 | .. | .. | .. | .. |
| 0,2 | a02 | .. | .. | .. | .. | .. |
| 0,3 | a03 | .. | .. | .. | .. | .. |
| 0,4 | a04 | .. | .. | .. | .. | .. |
| 0,5 | a05 | a15 | a25 | .. | .. | .. |
| 0,6 | a06 | a16 | a26 | .. | .. | .. |
| 0,7 | a07 | .. | .. | .. | .. | .. |
| 0,8 | a08 | .. | .. | .. | .. | .. |
| 0,9 | a09 | .. | .. | .. | .. | .. |
| 1 | a0A | .. | .. | .. | .. | a5A |

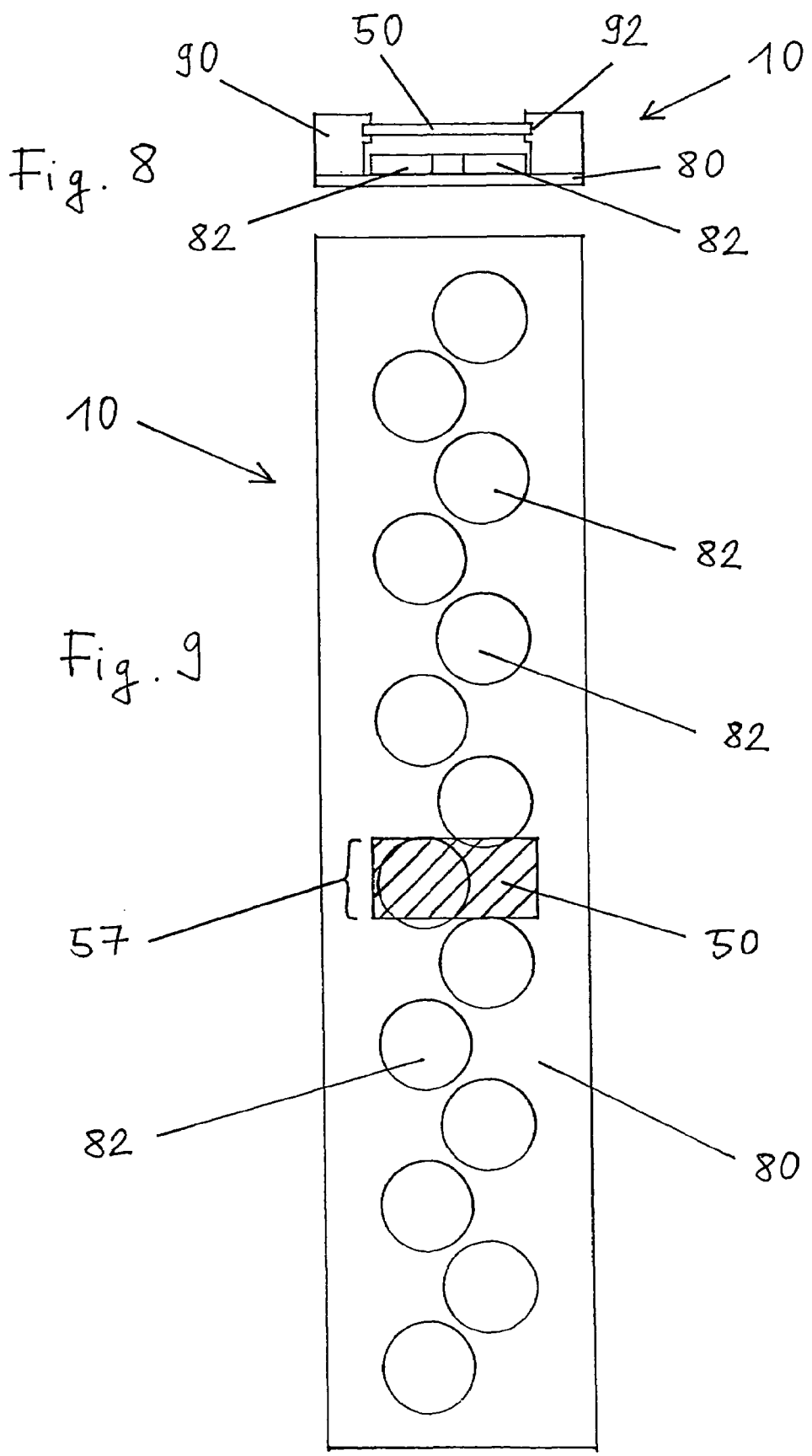

DEVICE AND METHOD FOR DETERMINING THE PATH OF A TARGET

The present invention relates to a device for determining the position of a metal target. In a further aspect the invention relates to a method for determining the position of a metal target.

A prior art device has at least two detection devices, which are so positioned along a path length to be monitored that the sensitivity curves of immediately adjacent detection devices at least partly overlap, the detection devices in each case having at least one inductance coil and at least one oscillator and supply a distance signal as a function of the distance of the target from the particular detection device. A prior art device also has at least one converting device which is in operative connection with the detection devices for converting the distance signals detected by the detection devices into analogue signals, as well as at least one evaluating device in operative connection with the converting device or devices for determining and reading out a local position of the target from the analogue signals going back to the particular detection devices.

In the prior art method at least two detection devices are so positioned along the path to be monitored that the sensitivity curves of directly adjacent detection devices at least partly overlap, the detection devices supplying a distance signal as a function of the distance from the target. In addition, the distance signals detected by the detection devices are converted by at least one converting device into analogue signals, particularly current and/or voltage signals, and from the various analogue signals going back to the detection devices the position of the target is determined.

Such devices are used in numerous industrial processes in connection with automation. There are numerous application possibilities, also in the field of car technology. For example DE 102 04 453 A1 describes an analogue, inductive displacement pickup with which it is possible to determine a relative displacement between a vehicle seat and a vehicle body. The measuring principle is the change to the magnetic induction in the case of a relative displacement of a test body made from a material with high magnetic permeability. Thus, a ferromagnetic material is required for the magnetic coupling, so that there are restrictions to the possible uses of the inductive displacement pickup described therein with respect to the material of the target or object to be followed. In particular, ferromagnetic targets are frequently mechanically very sensitive.

With regards to a specific determination of the space coordinates of a target, a further problem is that the detection curves of the detection devices or sensors used generally do not permit a clear association of a measured value with a defined position of the object relative to the sensor. Instead such sensors, e.g. inductive proximity switches, supply the same measured value for a plurality of positions thereof, e.g. for two points facing one another with respect to an axis of symmetry on a straight line.

In order to obviate the last-mentioned problem, use has been made of tilted longitudinal coils. However, as the detection signal is then very highly dependent on the distance, only very limited path lengths can be monitored.

EP 1 306 649 A1 describes an inductive sensor arrangement for determining a rotary or translatory position, in which a plurality of primary or secondary coils is positioned along a path to be monitored. An electromagnetic influencing of the coils by the target is used for position detection purposes.

DE 101 30 572 A1 relates to an inductive displacement sensor for determining the position of an influencing element. In order to provide an inductive displacement sensor with a very limited construction length and high measuring accuracy, it is proposed therein to connect one and the same capacitor with the aid of a changeover switch to a plurality of inductance coils arranged along the path length in order to form a resonant circuit. The measuring effect used is the transformer effect, i.e. the voltage induction in the influencing element on the basis of the electromagnetic oscillation in the particular resonant circuit activated.

DE 42 13 866 A1 relates to a position sensor for determining linear or rotary movements with high resolution. For solving the problem of making available a robust sensor inter alia permitting a high resolution, it is proposed that for the sensor is provided a device for performing a sample analysis which analyzes the characteristics of the inductance coils.

DE 197 38 839 A1 relates to an inductive angular sensor. In order to produce in a very simple manner from the sinusoidal output signals of the receiving coils a linear sensor output signal linked with the rotary element position, an angular sensor is proposed in which a selection device selects as a function of the instantaneous output signals of a plurality of receiving coils at least one of said output signals and from it determines the instantaneous rotary element position.

The object of the invention is to provide a device and a method for determining the path of a target where, compared with the prior art solutions, far more possible uses exist.

The prior art device is inventively further developed in that the detection devices can output as a distance signal in each case one oscillator damping signal.

The first essential idea of the invention is that, unlike in the prior art, the detection principle is not based on using the induction brought about by a high permeability object, i.e. a ferromagnetic object, but instead use is made of the damping of an oscillator by the target. As such a damping can be detected for random metallic objects and not only for ferromagnetic objects, in principle random metallic targets, particularly also robust, metallic targets, e.g. of stainless steel can be tracked or followed. As a result the use range is considerably extended compared with the prior art.

A further essential idea of the present invention is that a plurality, i.e. at least two detection devices are positioned along a path to be monitored. Thus, not only randomly long and randomly shaped paths can be monitored, but in addition any ambiguities of the detection signals can be eliminated by suitable evaluation. To this end, according to the invention, the detection devices are so positioned that the sensitivity curves of directly adjacent detection devices at least partly overlap.

Thus, a device according to the invention permits a linear path determination of a metallic object. The arrangement of the path can be randomly long and assume random shapes, e.g. linear, circular or zig-zag. In principle, path configurations in the two and three-dimensional form can be determined.

A typical requirement of industrial processes which can be eminently fulfilled with the present invention is that an object or target must be detectable over a length of e.g. 100 mm with a precision of at least 1 mm. In a special case the object is always at the same axial distance from the detection devices or sensors.

If two-dimensional paths are to be detected, in this connection reference is also made to a path determination in two directions or an areal path determination and it can be appropriate to make use of suitably shaped, e.g. in particular small inductance coils. This is particularly appropriate if the paths to be determined have especially small radii of curvature.

In a particularly advantageous variant of the inventive device the detection devices are in each case characterized by a damping curve corresponding to the sensitivity curve, said damping curve in each case having partial areas with a high spatial or positional resolution. The damping curve corresponds to the oscillation amplitude of the oscillator, preferably kept in natural resonance, plotted as a function of the target position with respect to the detection device. In said preferred variant the detection devices are then so positioned that a detection curve for the entire path length to be monitored can be formed from the high positional resolution partial areas of the individual detection devices.

The sensitivity curves are appropriately standardized.

In this way a desired, high positional resolution can be achieved along the entire path to be monitored.

In preferred further developments the spacings of the detection devices are chosen in such a way that in the high positional resolution partial areas the positional resolution is everywhere greater than 10%, preferably greater than 20% and in particularly preferred manner greater than 40% of the maximum positional resolution. Obviously, with high sensor densities it is also possible to obtain configurations in which e.g. the positional resolution at no point drops below 90% of the maximum value.

In order to achieve a uniform positional resolution, it is also appropriate to equidistantly arrange the detection devices along the path length, e.g. the detection devices can be arranged in a row.

In a situation where a lateral extension of the sensors is greater than an optimum spacing for the resolution, the detection devices can be mutually displaced e.g. in parallel rows.

In a further useful development of the inventive device, which can e.g. be used in a chucking device, a guide device is provided for guiding the target along the path to be monitored.

It can e.g. be a guide rail in which a metallic target is movably located.

An essential advantage of the present invention is that no high demands are made with regards to the metallic target, e.g. it can be a simple, small metal plate.

In the area of the large sensor coverage by the target, in most cases there is a comparatively large area with a limited gradient of the sensitivity curve, i.e. the damping curve. In this area only a limited positional resolution can be obtained. In the extreme case of maximum coverage the positional resolution is zero. In order to reduce this low resolution area, it can be appropriate for the detection devices to be positioned along the path to be monitored in such a way that they in each case are only coverable partly by the target.

Alternatively or additionally the dimensions of the target can be made or selected such that an individual detection device, e.g. a sensor, cannot be completely covered by the target.

It can e.g. be appropriate if the detection devices are so positioned along the path to be monitored or the target is constructed in such a way that the detection devices can only be covered up to 90%, preferably only 85% and in particularly preferred manner only 80% by the target.

In a particularly preferred development, there is at least one multiplexer between a converting device and a plurality of detection devices. In this way the circuitry expenditure and therefore costs can be significantly reduced.

However, if a particularly high operating reliability is necessary or if a detection device is to be replaced together with a converting device as a separate unit, it can be appropriate for a converting device to be associated with each detection device. In principle, the inductance coils can be randomly oriented with respect to the path length to be monitored. It is in particular possible to use tilted longitudinal coils. In order to be able to monitor a very long path length with an individual detection device, i.e. to be able to make do with a minimum number of detection devices relative to the path length, it is appropriate for the inductivities, particularly the coils, of the detection devices to have their axes positioned transversely and in particular perpendicularly to the path length to be monitored.

A good compromise between detection reliability and a desired minimization of the number of detection devices used is brought about if the detection devices are so positioned that the area overlap of the sensitivity curves of directly adjacent detection devices is between 20 and 50%, particularly 25 and 35%.

In a particularly simple development of the inventive device, in the case of at least part of the detection devices, the inductance coil constitutes part of the oscillator. The number of necessary components can then be reduced to a minimum.

For numerous applications, e.g. if a substantially linear path is to be determined, it can be adequate for the detection devices to be able to determine a radial spacing of the target from an axis of the inductance coil in each case.

A method of the aforementioned type is inventively further developed in that the distance signal is in each case constituted by the damping signals of oscillators of the detection devices.

The associated effects and advantages have been explained hereinbefore in conjunction with the device according to the invention.

In a particularly preferred variant of the method, the detection devices are so positioned that a detection curve for the complete path to be monitored can be composed from partial areas with high positional resolution of the damping curves of the individual detection devices and that for determining the target position the measured damping values are compared with previously and in particular punctiform recorded teach-in data. In this way a very precise and particularly adequately reproducible position determination can be obtained.

Appropriately for recording the teach-in data the target is moved along the path to be monitored, the target position and the respective damping signals of the detection devices being locally recorded. This process can be repeated several times and subsequently the measured data obtained can be averaged for providing a calibration curve.

In principle, this method also permits a three-dimensional position determination and then on recording the teach-in data the target location is also varied transversely to the path to be monitored and the respective positions and damping signals are also locally recorded in this case.

In order to obtain a particularly high positional resolution, it is appropriate to use the damping curve of the particular detection device in connection with which the second highest damping is measured at the present target position. The situation is then such that one is neither in the vicinity of the damping minimum nor in the flat areas of the damping curves far away from the minimum. Rather, the second highest damping is measured when the target is in fact located in the vicinity of the left or right-hand side of the minimum.

According to an essential idea of the present invention, a spacing and/or position independence of the evaluation can be obtained if for evaluation purposes use is made of a pair of values consisting of the damping signal at which the second highest damping is measured and the damping signal at which the highest damping is measured.

In simple variants of data evaluation interpolation takes place between teach-in data points for determining the target position.

Moreover, to simplify evaluation, portions of the damping curves of the detection devices can in each case be approximated by straight lines for evaluation purposes.

On processing the analogue signals, which can take place by suitable hardware, e.g. microcontrollers, either only a portion of a coil is taken into account or several coils are simultaneously evaluated and subsequently a ratio is formed from the different values in order to determine more particularly in an unambiguous manner the precise path point.

Ratio evaluation is particularly appropriate with wider targets or a higher density of detection devices or coil systems.

Figure 1:
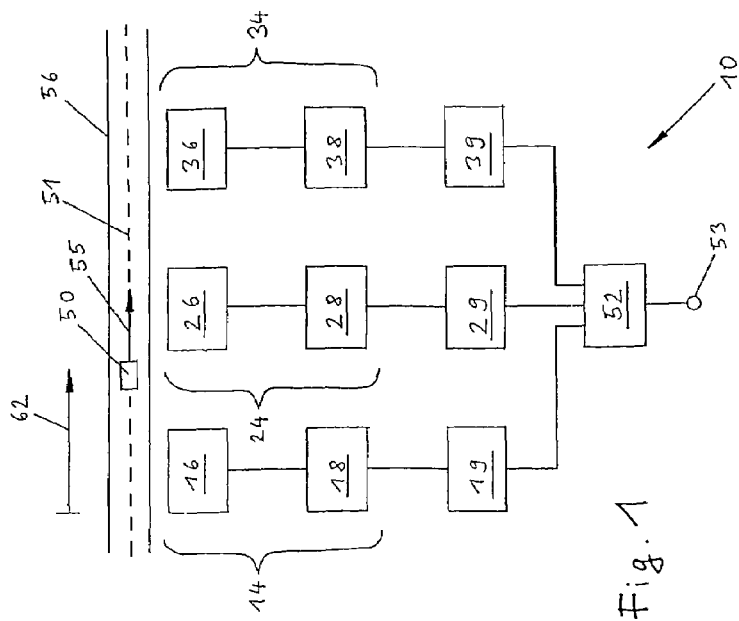

Further characteristics and advantages of the invention are described in greater detail hereinafter relative to the attached diagrammatic drawings, wherein show:

FIG. 1 A diagrammatic representation of a first embodiment of the device according to the invention.

Figure 2:
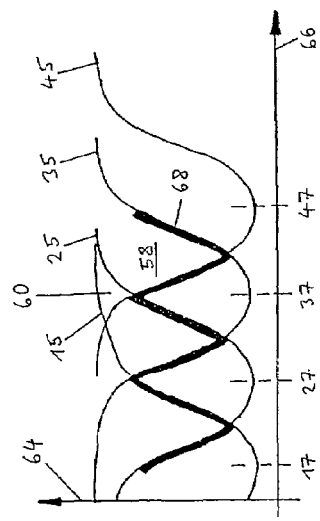

FIG. 2 A diagrammatic representation of the course of the sensitivity curves of a plurality of detection devices of a device according to the invention.

FIG. 3 A diagrammatic representation of a second embodiment of the device according to the invention.

Figure 4:
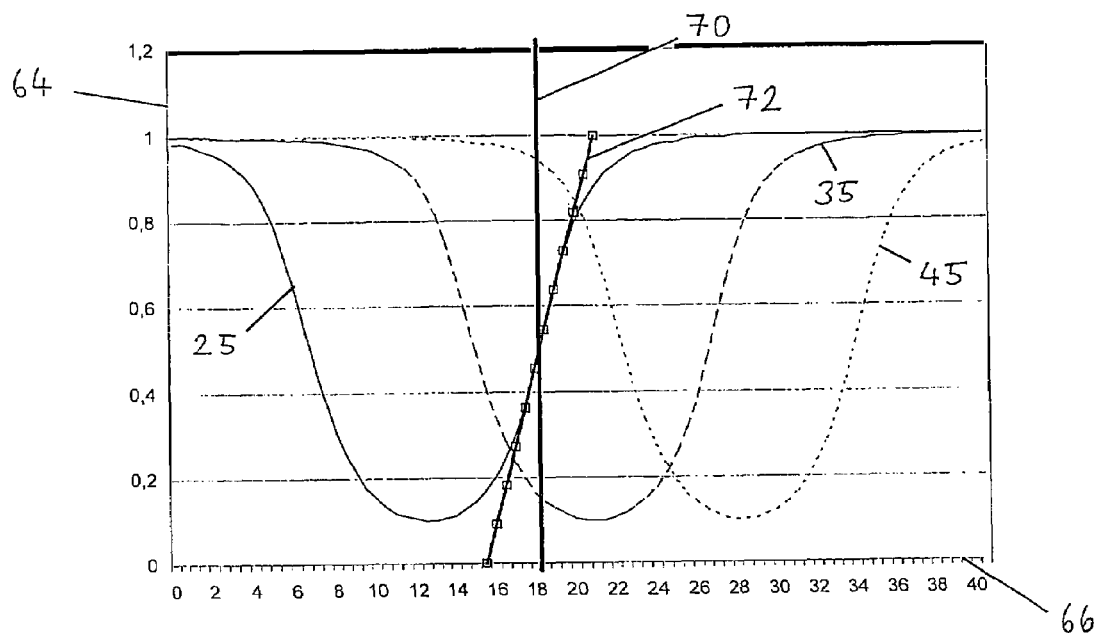

FIG. 4 Another diagrammatic view of the course of the damping curves of three sensors of an inventive device and an evaluation possibility.

Figure 5:
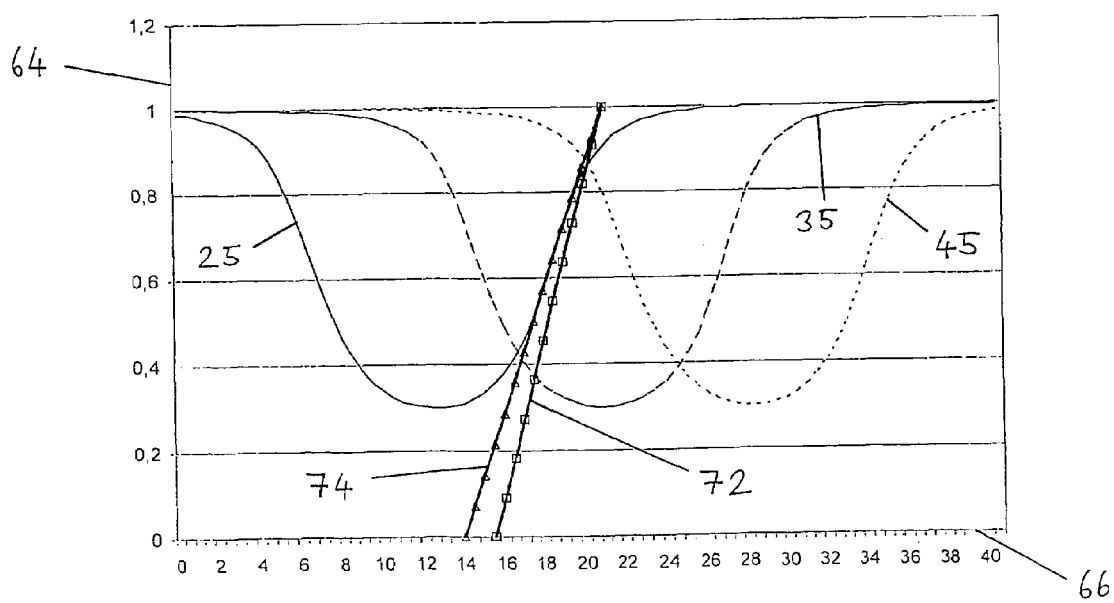

FIG. 5 A further representation of damping curves of three sensors of an inventive device with a modified spacing with respect to the target.

Figures 6, 7:
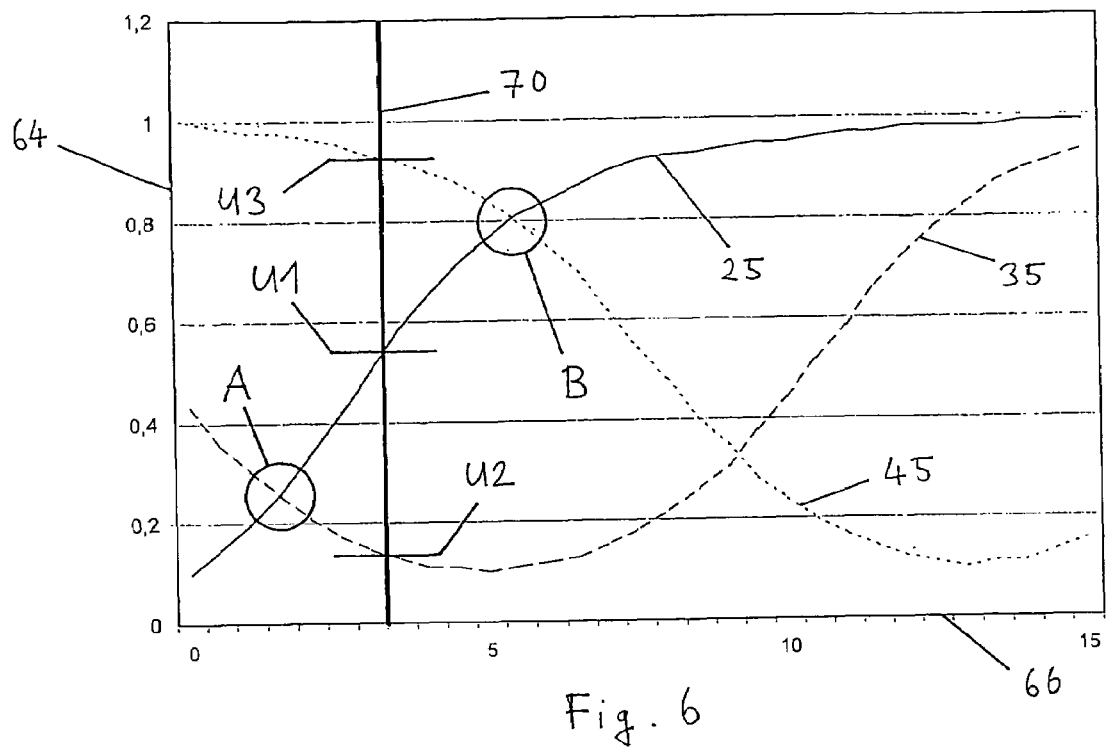

FIG. 6 A larger scale representation of damping curves of three sensors of an inventive device.

FIG. 7 A diagrammatic representation of teach-in data.

FIG. 8 A diagrammatic sectional view of an inventive device.

FIG. 9 A diagrammatic partial view of an inventive device.

FIG. 1 diagrammatically illustrates a first embodiment of a device 10 according to the invention. Three detection devices 14, 24, 34 are positioned along a path 51 to be monitored on a conveyor belt 56, which can e.g. be an assembly line. Each of the detection devices 14, 24, 34 has a coil system with an inductance coil 16, 26, 36 as part of an oscillator 18, 28, 38.

The detection devices 14, 24, 34 make use of the effect also effective in the case of proximity switches of a damping of an inductance coil forming part of an oscillator when the object or target to be detected is brought into proximity with said inductance coil 16, 26, 36. As a function of a relative position of an object 50 to be monitored with respect to the inductance coil 16, 26, 36, the oscillators 18, 28, 38 are damped. For converting the damping effects detected by the detection devices 16, 26, 36 into analogue signals, particularly current and/or voltage signals, each of the oscillators 18, 28, 38 is connected to converting devices 19, 29, 39.

The measurement signals supplied by the converting devices 19, 29, 39 are ambiguous for principle measurement reasons, so that from a specific measurement signal clear conclusions cannot be drawn with regards to a particular space position of the target 50. Thus, the converting devices 19, 29, 39 are connected to a common evaluating device 52 for determining an unambiguous position from the analogue signals from the detection devices 19, 29, 39.

Unlike in the case of analogue proximity switches, in the case of the device 10 shown in FIG. 1, it is not the distance from the target 50 to the sensor faces which is measured, but instead in the case of a constant axial distance or spacing the change of the damping through the change to the coverage of the inductance coil 16, 26, 36 by the target 50, which corresponds to the lateral, i.e. radial distance from the centre of the coil or coil axis.

The following processing by corresponding hardware, e.g. by a here not shown microcontroller, makes it possible to link the sensitivity curves in such a way that the association becomes clear and a single signal reproducing the path length can be outputted.

It is possible to carry out a simple evaluation or also a ratio evaluation. In the first case, illustrated hereinafter relative to FIG. 2, in each case only details from the sensitivity curves for an individual detection device are taken into account. In the ratio evaluation several coils are simultaneously evaluated and ratios formed from the analogue signals obtained, so as in this way to determine the precise path point.

An analogue signal is made available at an output 53 and in the present case represents in connection with a coordinate axis 52 a clear position of the target 50 to be monitored, whose movement direction is indicated by arrow 55.

In principle, evaluating devices with several outputs are possible giving the position of a target 50 relative to further coordinate axes.

Another embodiment of an inventive device is diagrammatically shown in FIG. 3.

Equivalent components are given the same references as in FIG. 1.

Unlike in FIG. 1, between the oscillators 18, 28, 38 and a common converting device 59 a multiplexer 54 is provided for switching between the individual oscillators 18, 28, 38. As only one converting device 59 is required, this variant is particularly appropriate for applications where a particularly long path 51 is to be monitored, i.e. if a particularly large number of detection devices 14, 24, 34 is required.

Otherwise the development according to FIG. 3 corresponds to the embodiment described relative to FIG. 1.

FIG. 2 diagrammatically shows the course of the sensitivity curves 15, 25, 35, 45 of in all four detection devices. The output signal of the corresponding converting device is shown on the vertical axis 64 compared with the space coordinate on the horizontal axis 66.

As can be gathered from FIG. 2, the sensitivity curves 15, 25, 35, 45 in each case have a minimum 17, 27, 37, 47, which corresponds to a minimum spacing of the target 50 from the particular inductance coil 16, 26, 36, i.e. a maximum damping. The target 50 is then directly in front of the particular inductance coil 16, 26, 36. In the present case the coil axes of inductance coils 16, 26, 36 are perpendicular to the path 51 to be monitored, which leads to a symmetrical course of the sensitivity curves 15, 25, 35, 45 on either side of the minimum 17, 27, 37, 47. The greater the distance of the target 50 from the minimum 17, 27, 37, 47, the greater the value of the corresponding sensitivity curve 15, 25, 35, 45 or the smaller the damping.

The detection devices are so positioned relative to one another that e.g. the sensitivity curves 35, 45 belonging to adjacent detection devices overlap over approximately 30% of their surface. The overlap area is designated with the reference 58. Experiments have shown that with overlap values of around 30% it is possible to obtain an adequate reliability of the position determination with an acceptable number of necessary detection devices.

The sensitivity curves of the detection devices arranged separately from one another through in each case one further detection device overlap in the embodiment of FIG. 3 over approximately 10% of their surface. The exemplified overlap area of the curves 25, 45 is designated with reference 60.

Use is made for evaluation purposes solely of the portions of sensitivity curves 15, 25, 35, 45 designated by the thicker line 68. The areas 68 of sensitivity curves 15, 25, 35 correspond to the high positional resolution areas of said damping curves.

Further examples for the course of the sensitivity or damping curves 25, 35, 45 are shown in FIGS. 4 to 6. What is plotted is in each case the oscillation amplitude of the oscillator of the particular detection device in standardized units on ordinate 64 compared with the position of the target 50 along the path being monitored. The position is given in millimetres on abscissa 66. Equivalent components in FIGS. 4 to 6 are given the same references.

The structure of the device 10 used is diagrammatically illustrated in FIGS. 8 and 9. The device 10 essentially comprises a printed circuit board 80 with in all fourteen sensors 82. The circle representing each of the sensors 82 corresponds to the boundary of a core of the oscillator inductance coil.

In the embodiment shown the target or object 50 is a thin metal plate, which is movably mounted in guide grooves 92 of a guide device. As is apparent from FIG. 8, the printed circuit board 80 is so positioned relative to the guide device 90 that the target 50 is guided over the individual sensors 82 when it is moved along the guide grooves 92.

The device 10 shown in FIGS. 8 and 9 can be used in a chucking device, with which e.g. in car manufacture are secured two metal sheets to be welded together. Such a chucking device moves its jaws until they strike against the sheets to be retained, e.g. with the aid of compressed air. The target 50 is mechanically connected to the jaws in such a way that the angular position is linked via a monotonic function with the linear position of the target 50 in guide device 90, which in an alternative construction can be in the form of a cylinder. The position of the target 50 is then measured with the aid of the inventive device 10.

Prior to starting operation in the case of the embodiment of the inventive device 10 shown and in accordance with a variant of the inventive method, calibration or teach-in curves are recorded and the target 50 is guided along the path to be monitored and the position of the target 50 and the dampings of the individual sensors 82 are locally recorded. The determination of the object position on recording the teach-in curves can take place in the simplest case using a rule.

In order to obtain identical sensor characteristics for the individual detection devices, in a first step the sensors are aligned, e.g. with a steel plate held in front of the printed circuit board 80 in such a way that all the sensors 82 are at the same distance from said plate.

The recording of the teach-in curves gives a set of curves of the type shown in FIGS. 4 to 6.

During the actual measurement the position is determined from the specifically measured damping signals with the aid of the teach-in curves.

The teach-in curves can e.g. be recorded four times and then a mean value is formed. It is also possible for a specific application to record the teach-in curves in each case with the workpieces, e.g. the metal sheets to be retained during the actual operation of the chucking device.

As a result of different effects, particularly wear to the mechanism, wear to the plastic coverings or dirtying, the angular position of the chucking device jaws and/or the linear position of the target 50 can vary in the closed state, although there is no change to the thickness of the inserted sheets.

If at the start of use the end positions, i.e. the states "jaws open" and "jaws closed with metal sheet" are recorded once, by local recording of the position of the target 50 in the closed state information can be obtained regarding the chucking device wear over a longer operating phase. For example, if the position of the target 50 has moved from the originally determined position by more than a fixed value, the chucking device or at least parts thereof can be replaced.

Thus, in principle, it is possible to again record calibration or teach-in curves following a specific operating period.

In particularly preferred embodiments of the chucking device there is a change to the transmission ratio of the mechanism over the angular travel of the jaws. The more the jaws move in, the greater the linear displacement of the target 50 per angular unit.

FIG. 4 shows a detail from the damping curves 25, 35, 45 of three adjacent sensors 82. The vertical line 70 e.g. indicates a position of the target 50. What is plotted is in each case the maximum oscillation amplitude of the three oscillators of sensors 82. In the specific example the axes of the coil systems are spaced from one another by 8 mm along the monitored path. The geometry of the damping element, i.e. the target 50, is decisive for the course of the damping curves 25, 35, 45.

The curves shown in FIG. 4 were plotted with a damping element, i.e. a target 50, having a width of 8 mm. In FIG. 9 said width is indicated by the bracket 57. If the target 50 is wider or narrower, the intersections of the curves are displaced and the positional resolution is reduced along the path to be monitored, because then curve areas must be used for the evaluation which have a smaller gradient. The voltage travel in these areas is smaller, so that dispersions, measurement inaccuracies, possible temperature paths, etc. have a more pronounced effect and consequently resolution decreases.

The amplitude values for the three damping curves 25, 35, 45 considered here at the position of the vertical line 70 are utilized for position evaluation.

The simplest method for determining the position consists of approximating by lines between the intersections of the curves resulting through the coverage of the coil systems. This is shown in exemplified manner in FIG. 4 for the area between the intersections of lines 25 and 35. This area is approximated by a line 72 in FIG. 4. In this method a single coil system is used for calculating the position of the target 50 and for this purpose the dampings of all the coil systems are measured and the coil with the second highest damping is used for position evaluation, because this coil has the steepest voltage path in the considered area.

This method can be further improved, because a change to the spacing of target 50 transverse to the path to be monitored also leads to changed dampings of the sensors 82. As a result the resolution is once again reduced, because a distance of the target 50, i.e. the damping element, from the device 10 transverse to the path to be monitored for an individual sensor 82 brings about the same effect as a lateral movement of target 50 along the path to be monitored. Thus, it is unimportant when a target 50 approaches a single sensor 82, which leads to a greater oscillator damping, whether this approach is along or transverse to the path to be monitored.

If there is a change to the spacing of target 50, i.e. the damping element, from the device 10 transverse to the path to be monitored, there is also a clear change to the damping amplitudes of the oscillators of the given sensors 82. This can be clearly seen in FIG. 5, in which the spacing of target 50 has been increased by 0.5 mm compared with the curves in FIG. 4.

FIG. 5 additionally plots the line 72, which corresponds to the linearization of the course of the curve 25 between the intersection of curve 25 with curves 35 and 45 in FIG. 4. FIG. 5 also shows for curve 25 a line 74, which corresponds to the linearized course of the partial area between the intersections of curve 25 with curves 35 and 45.

The damping curves 25, 35, 45 shown in FIG. 4 were recorded at a spacing of target 50 of 2.5 mm from sensors 82. Curves 25, 35, 45 in FIG. 5 correspond to a situation in which the target 50 is 3 mm from the sensors 82.

As a result of the different course of the lines 72 and 74 in the relevant area between the intersections of curve 25 with curves 35 and 45, in the least favourable case there is a position determination deviation, i.e. a position error, of 1.35 mm. Thus, resolution and precision of position determination are significantly reduced when the damping element does not very precisely maintain a predetermined spacing from sensors 82.

Thus, the method described here would be unsuitable when a customer required a +/−1 mm for the maximum spacing change of the target of in all 1.5 mm.

To take account of this, according to the invention an evaluation method has been developed which makes the position calculation largely independent of the spacing of the damping element, i.e. the target 50 from the coil system-forming sensors 82.

In this method, in addition account is taken of the damping of the coil positioned directly below the damping object, i.e. the target 50. This is the sensor subject to the greatest damping. In addition, an interpolating line is no longer used for position determination along the monitored path.

This is illustrated by FIGS. 6 and 7.

The position of target 50 indicated by vertical line 70 in FIG. 6 is between the intersections A and B of curve 25 with curve 35 or 45. In this area the voltage U1 of damping curve 25 is greater than the voltage U2 resulting from the curve path 35 of an adjacent coil, but is below the voltage U3 of the other adjacent coil represented by curve 45. The voltages of the individual sensors 82 are standardized or sized on a range of 0.1 to 1 volt. In general, standardization or sizing can take place to random values. The only prerequisite is that all the coil systems, i.e. all the sensors 82, are individually sized or standardized to a clearly defined range in order to compensate tolerances between the individual coils and components of the evaluating units, e.g. the oscillators. This can e.g. take place in such a way that the oscillators are adjusted to the same amplitude for the same coverage of all the coils and the same spacing of the damping element, i.e. the target 50, with respect to the coils. In practice this can take place by adjustment in the case of a simultaneous damping of all the coils with a large steel plate in a clearly defined spacing.

An essential idea of the evaluating method is to utilize the fact that for each pair of values of voltages U1 and U2 in the area from point A to point B there is precisely one associated position, so that a clear association is possible. With each of these value pairs can be associated precisely one spacing, i.e. a distance of target 50 from sensors 82 transversely to the path to be monitored.

In general the present description understands by the term "position" the location of the target 50 at a particular point of the monitored path. As opposed to this, "spacing" is the distance of the target 50 from the sensors 82 at right angles to the monitored path.

In the most frequent applications the position of the target 50 is to be determined. Hereinafter is explained how this can take place with the aid of a pair of values. In principle, it is possible to evaluate the spacing of the damping element, i.e. the target 50, with respect to the sensors 82 as a method quantity. Evaluation takes place largely identically.

The course of the position as a function of the two quantities U1 and U2 can take place by local recording of the measured values in defined steps. For this purpose the position of the target 50 is varied in a defined step width and on the other hand at each position the spacing of the target 50 is varied with a defined step width.

The thus obtained measured value pairs can be approximated by mathematical methods, so that there can also be a precise position determination between these measured values. In a simple variant, interpolation takes place between the individual points with the aid of a measured value table. For this purpose the measured value pairs are placed in a two-dimensional table with axes U1 and U2 and the associated position is inserted in the particular table boxes. Such a table is shown in FIG. 7.

For position calculation purposes, a search is made in the table for the next lower entry to the particular value pair and with the aid of adjacent values by interpolation a calculation is made of the actual position of the monitored target 50.

For example, the value pair (U1, U2)=(0.535; 0.28) is determined by measurement. The next lower table entry is a15. The actual position of the target 50 can now be calculated by interpolation from entry a15, a16, a25 and a26.

If, instead of being filled with the values for the particular positions, the table is filled with those for different spacings, it is possible in the same way to calculate the spacing of the damping element independently of the position. Through the use of both tables it is also possible to carry out a two-dimensional determination or with an appropriate arrangement of the coil systems, e.g. in a rectangle, also a three-dimensional determination.

The calculation by means of a table and interpolation is particularly suitable for non-powerful systems, because they only make very limited computing power requirements. If more computing power is available, the position path or the spacing path of the value pairs can also be approximated by a linear, continuous function, which allows a more precise calculation and/or a higher resolution.

With regards to the attainable positional resolution, an important part is played by the arrangement of the sensors or more specifically the sensor spacing. If e.g. the damping curve of a single sensor 82 is considered, the resolution in the vicinity of the left and right-hand sides of the minimum is high, but otherwise low. For example, at the minimum it is virtually zero. The spacings of the sensors 82 are in the case of the variant of FIGS. 8 and 9 chosen in such a way that between the intersections of curves 25, 35, 45 in each case there are only steep areas and thus the resolution is high everywhere.

A further positional resolution improvement can be obtained if the target 50 has its dimensions chosen in such a way that the individual sensors 82 cannot be completely covered. Tests performed have e.g. shown that between 8/9 and 9/9 sensor coverage enabled no damping change to be established. If the monitored target 50 is made somewhat smaller, it is possible for the minima of the damping curves to be sharper. The target 50 of FIG. 9 has a width 57 of 8 mm, whereas the diameter of the sensors 82 is in each case 9 mm.

In addition, the requirement for a constant, high resolution over the entire path leads to a specific spacing of the sensors 82. If said spacing was made smaller than a diameter of the sensors it is possible, as here, to choose a zig-zag arrangement.

In the situation shown here the target is a small metal plate with a length of 16 mm, a width of 8 mm and a thickness of 1 mm. The diameter of the sensors is 9 mm. With regards to a high positional resolution, the ideal sensor spacing was found to be 8 mm. The fourteen sensors are, as shown in FIG. 9, arranged in mutually displaced manner in two rows, the spacing of the centres of two sensors 82 in the same row being 16 mm. The spacing from the closest sensor 82 on the opposite side is in each case 10 mm. Thus, the target 50 is dimensioned in such a way that a single sensor 82 can never be completely covered.

Using a corresponding arrangement it is also possible to monitor non-straight paths. For this purpose the sensors 82 merely have to be arranged along a curve.

The present invention provides an inductive, linear path measuring system for detecting a metallic object over a clearly defined path length with which it is possible to monitor randomly long and randomly shaped paths and which in particular makes also possible the monitoring of robust, metallic targets, which need not be ferromagnetic.

The invention claimed is:

1. Device for determining the position of a metallic target, with at least two detection devices which are so positioned along a path to be monitored such that a sensitivity curve of immediately adjacent detection devices at least partly overlap, the detection devices having in each case at least one inductance coil and at least one oscillator and, as a function of a distance of the target from the detection device, supply a distance signal, with at least one converting device operatively connected to the detection devices for converting the distance signals detected by the detection devices into analogue signals, and with at least one evaluating device operatively connected to the at least one converting device for determining and reading out a local position of the target from analogue signals going back to the particular detection devices, a damping signal of the oscillator being in each case outputtable by the detection devices as the distance signal, wherein a damping curve of the detection device in each case has partial areas with high positional resolution, wherein the detection devices are so positioned that from the partial areas of high positional resolution of the individual detection devices a detection curve for the entire path to be monitored is composed and wherein the detection devices are arranged in two parallel rows in mutually displaced manner for increasing the positional resolution.

2. Device according to claim 1, wherein in the partial areas of high positional resolution the positional resolution is everywhere greater than 40% of the maximum positional resolution.

3. Device according to claim 1, wherein the detection devices are equidistantly arranged along the path.

4. Device according to claim 1, wherein there is a guide device for guiding the target along the path to be monitored.

5. Device according to claim 4, wherein the target is movably positioned in the guide device.

6. Device according to claim 1, wherein the detection devices are so positioned along the path to be monitored that they are in each case only partly coverable by the target.

7. Device according to claim 1, wherein the detection devices are so positioned along the path to be monitored that they are in each case only 80% coverable by the target.

8. Device according to claim 1, wherein the dimensions of the target are so chosen or formed that an individual detection device can only be partly covered by the target.

9. Device according to claim 1, wherein the target is a small metal plate.

10. Device according to claim 1, wherein each detection device is associated the converting device.

11. Device according to claim 1, wherein there is at least one multiplexer between a converting device and a plurality of detection devices.

12. Device according to claim 1, wherein inductance coils of the detection devices are arranged with their axes perpendicular to the path to be monitored.

13. Device according to claim 1, wherein the inductance coil is provided as part of the oscillator in at least part of the detection devices.

14. Device according to claim 1, wherein the detection devices are so positioned that the areal overlap of the sensitivity curves or damping curves of mutually adjacent detection devices is between 25 and 35%.

15. Device according to claim 1, wherein the detection devices can in each case determine a radial spacing of the target from an axis of the inductance coil.

16. Method for determining the position of a metallic target, in which at least two detection devices are so positioned along a path to be monitored that the sensitivity curves of directly adjacent detection devices at least partly overlap, the detection devices supplying a distance signal as a function of the distance of the target, in which the distance signals determined by the detection devices are converted by at least one converting device into analogue signals and in which from the different analogue signals going back to the detection devices the position of the target is determined in which the distance signal is in each case constituted by damping signals of oscillators of detection devices, wherein the detection device with the second highest damping is used for evaluating the damping signal.

17. Method according to claim 16, wherein the detection devices are positioned in such a way that a detection curve for the entire path to be monitored can be composed from partial areas with a high positional resolution of the damping curves of the individual detection devices and that for determining the position of the target the measured damping values can be compared with previously recorded teach-in data.

18. Method according to claim 17, wherein for recording the teach-in data the target is guided along the path to be monitored, the position of the target and the respective damping signals of the detection devices being locally recorded.

19. Method according to claim 17,
wherein on recording the teach-in data the position of the target is also varied transversely to the path to be monitored and the respective positions and damping signals are locally recorded.

20. Method according to claim 16,
wherein the sensitivity curves of the detection devices are standardized.

21. Method according to claim 16,
wherein for evaluation purposes use is made of a pair of values comprising the damping signal with the second highest and the highest damping.

22. Method according to claim 17,
wherein for determining the position of the target interpolation takes place between points of the teach-in data.

23. Method according to claim 17,
wherein portions of the damping curves are in each case approximated by lines for evaluation purposes.

24. Method according to claim 16,
wherein for evaluation purposes, in each case, account is taken of only one portion of a detection device or that several detection devices are simultaneously evaluated and in particular ratios are formed from the analogue signals.

* * * * *